Oct. 7, 1958 — L. A. OHLINGER — 2,855,114
LOADING DEVICE
Filed March 30, 1945 — 4 Sheets-Sheet 3

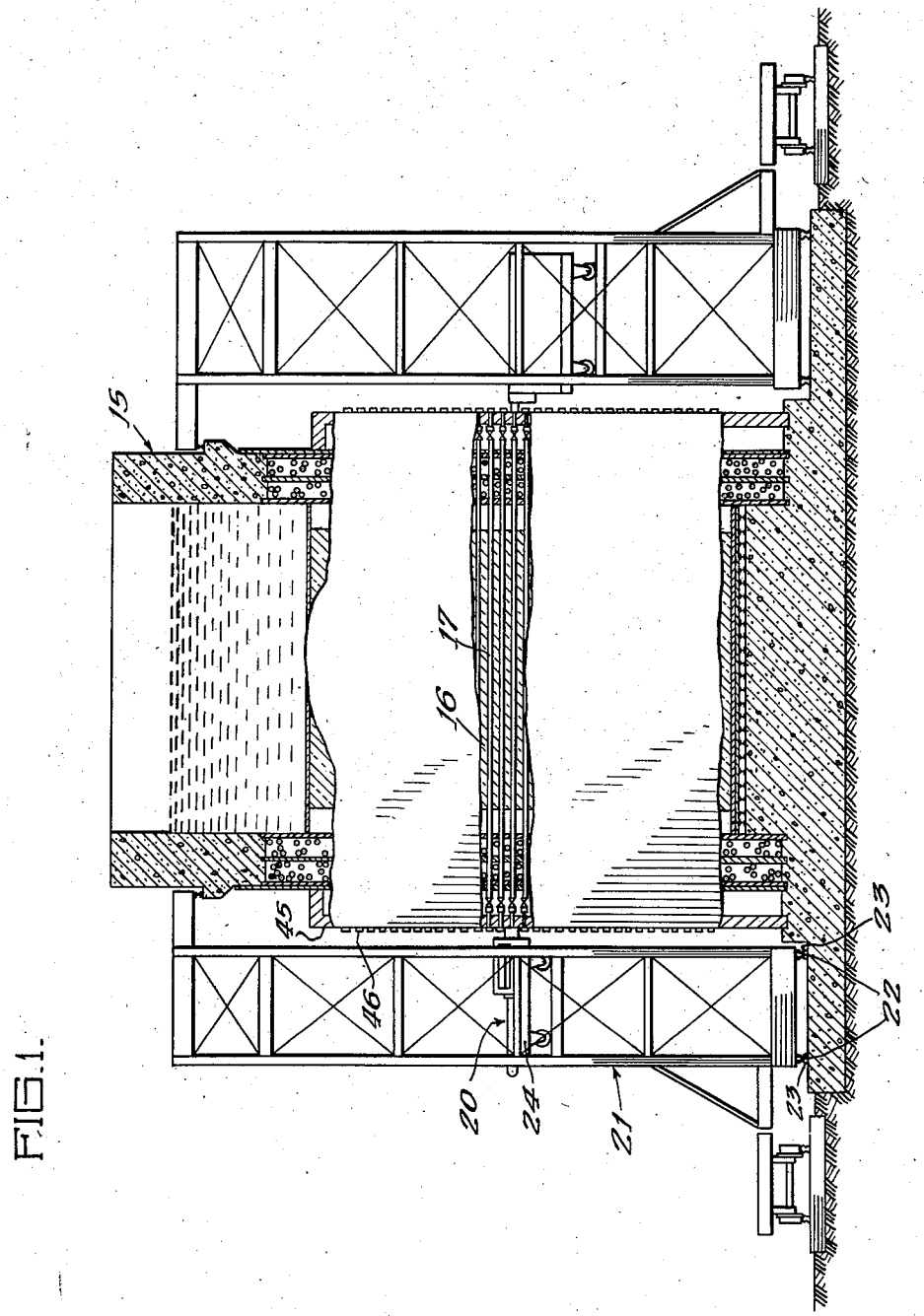

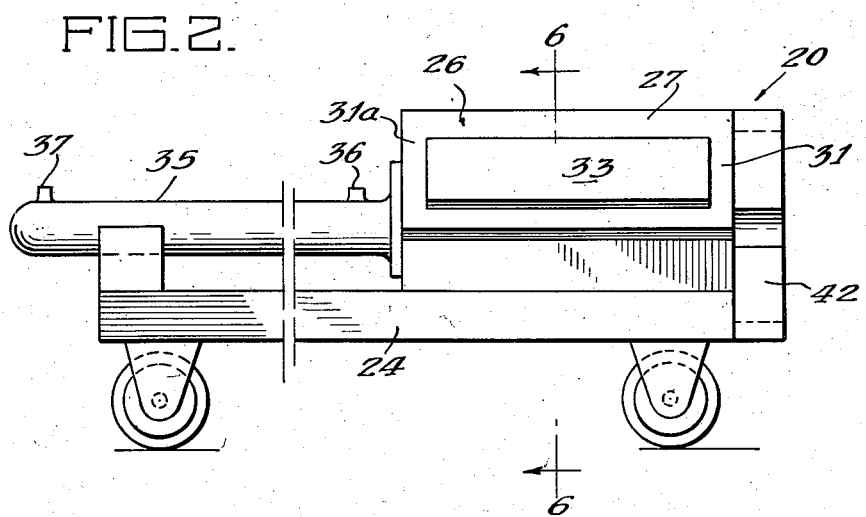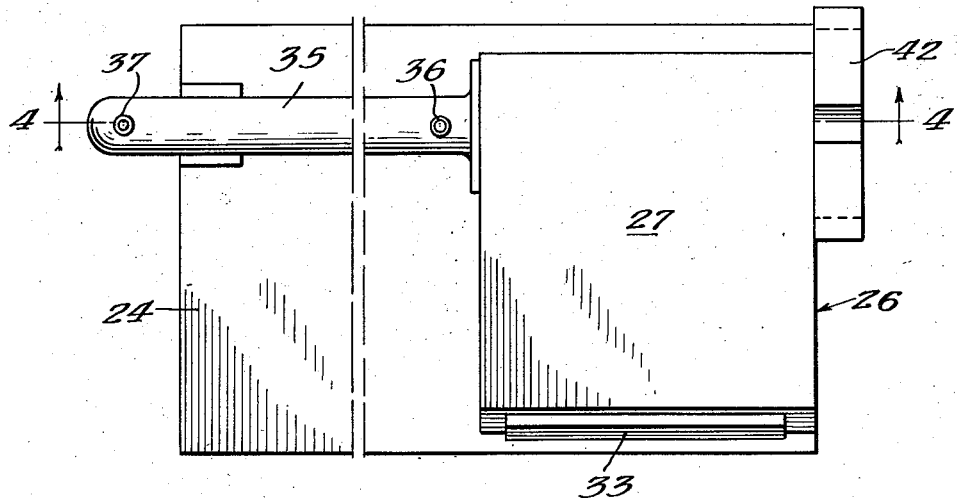

Witnesses:
Robert E. Metcalf
Nelson C. Caddeback

Inventor:
Leo A. Ohlinger
By: Robert A. Lavender
Attorney

Oct. 7, 1958     L. A. OHLINGER     2,855,114
LOADING DEVICE
Filed March 30, 1945     4 Sheets-Sheet 4
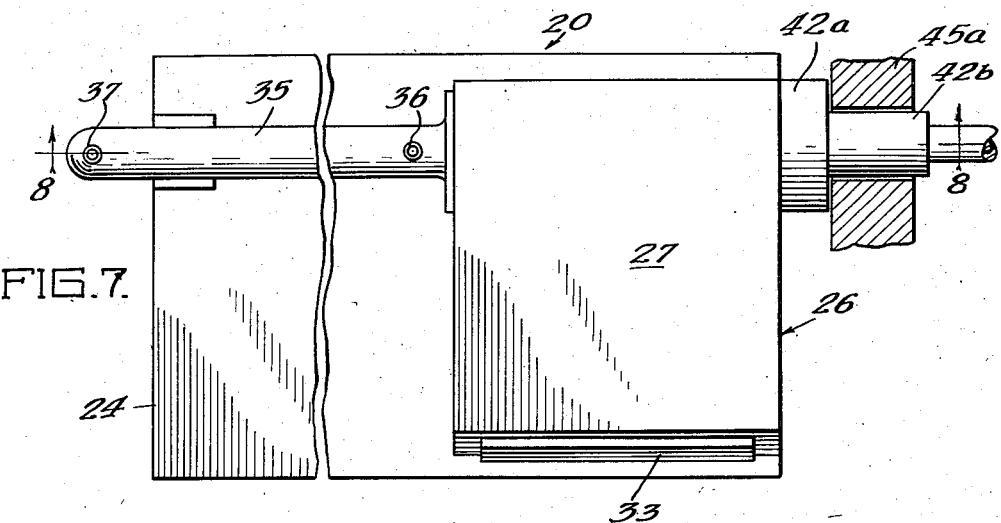
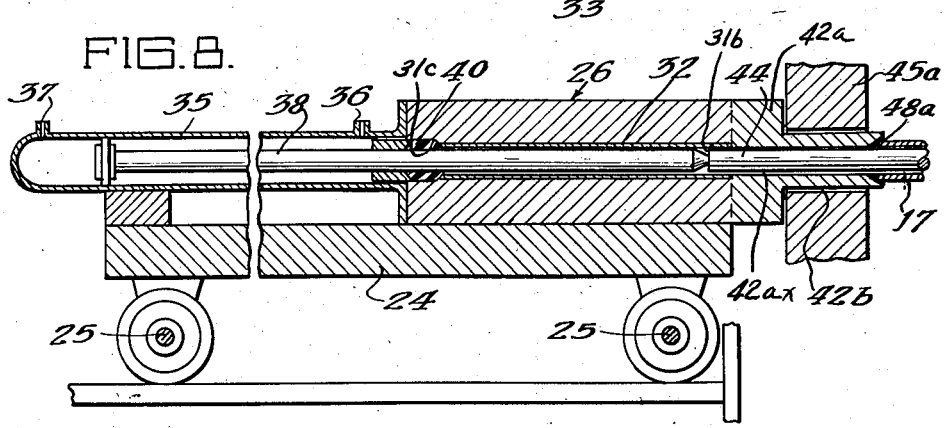
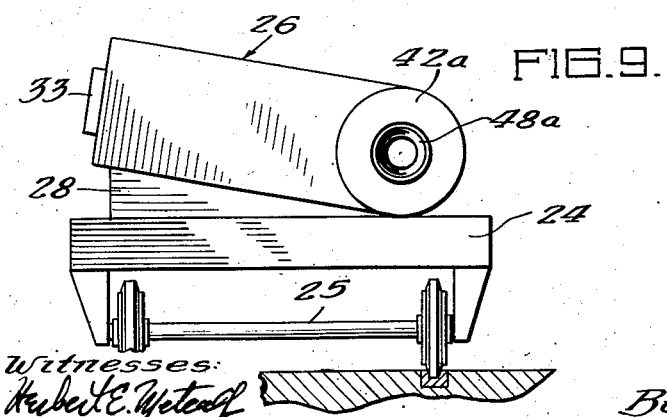
Inventor:
Leo A. Ohlinger
By:
Robert A. Lavender
Attorney United States Patent Office 2,855,114
Patented Oct. 7, 1958

2,855,114

LOADING DEVICE

Leo A. Ohlinger, Chicago, Ill., assignor to the United States of America as represented by the United States Atomic Energy Commission Application March 30, 1945, Serial No. 585,762

1 Claim. (Cl. 214—18)

This invention relates to a device for loading or charging bodies of fissionable material into a neutronic reactor.

In a neutronic reactor bodies comprising a neutron fissionable isotope are arranged in a neutron moderator so as to produce a sustaining neutronic reaction. Fissionable isotopes such as $U^{233}$, $U^{235}$ or $94^{239}$ are satisfactory to sustain such reactions. Fast neutrons are evolved as a result of fissions taking place in the fissionable material and these fast neutrons are moderated by the moderating material as the result of successive collisions with nuclei of the moderating material. The neutrons thus slowed may be absorbed by nuclei of the fissionable material. This produces additional fissions. Carbon, beryllium and heavy water ($D_2O$) are typical moderators suitable for use in neutronic reactors.

The details of the neutronic reactor in no way form part of the present invention and therefore further description herein is unnecessary. For a more complete description of the structure and operation of a neutronic reactor, reference may be had to a patent of Fermi et al. 2,708,656, dated May 17, 1955. A more complete description of neutronic reactors also may be found in copending application of Leo Ohlinger et al., Serial Number 568,900, filed December 19, 1944.

A principal object of the present invention is to provide a novel device for charging bodies comprising a fissionable material into a neutronic reactor. This is to be done without requiring the operator of the device to expose himself unnecessarily to the harmful effects of neutrons and harmful radioactive radiations that may emanate from the reactor during the loading operation.

The foregoing constitutes some of the principal objects and advantages of the present invention others of which will become apparent from the following description and the drawings, in which:

Figure 1 is a more or less diagrammatic view illustrating a neutronic reactor and showing the loading device forming the subject matter of the present invention in a position to charge bodies comprising fissionable material into the reactor;

Figure 2 is a side elevational view of one embodiment of the present invention;

Figure 3 is a plan view of the device shown in Figure 2;

Figure 7 is a plan view of a loading device forming a slightly different embodiment of the invention;

Figure 8 is a longitudinal sectional view through the device shown in Figure 7 shown partially in elevation and taken on the line 8—8 of Figure 7; and Figure 9 is a front elevational view of the device shown in Figure 7.

Figure 4:
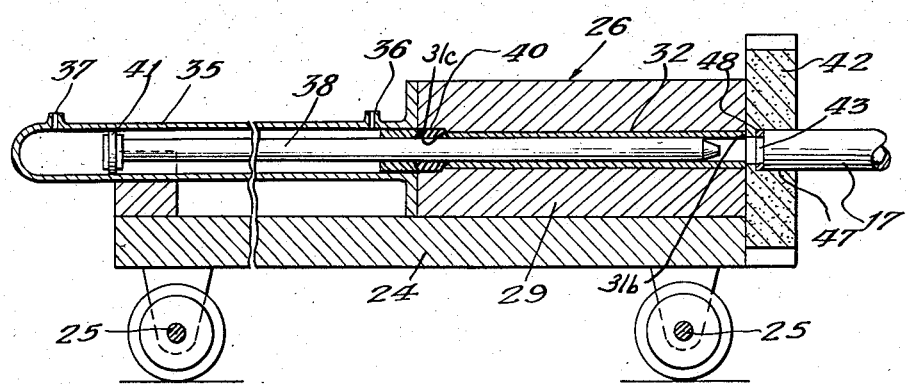
Figure 4 is a longitudinal sectional view shown partially in elevation taken through the loading device on the line 4—4 of Figure 3.
Figure 5:
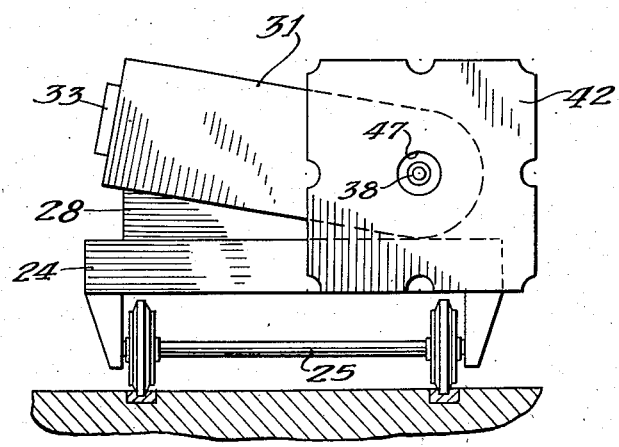
Figure 5 is a front elevational view of the loading device shown in Figure 2.

Reference is now made to Figure 1 specifically. In this drawing the neutronic reactor is shown generally at 15. Since the details of this reactor form no part of the present invention a complete description herein is unnecessary. It will be sufficient for a clear understanding of the invention to state only that the reactor includes a body of moderating material such as graphite, indicated at 16, through which are disposed a plurality of bodies of fissionable material. For present purposes these bodies will be referred to as uranium bodies or rods. These uranium rods are to be charged into the system at the left hand side of the reactor shown in Figure 1 and will be removed from the reactor at the right hand side thereof.

The present invention relates specifically to the loading device shown in Figure 1 in the form of a novel car shown supported on an elevator structure generally indicated at 21 and mounted on wheels 22 that are adapted to ride on rails 23. Thus it is apparent that the car 20 may be raised or lowered on the elevator structure 21 and may be moved laterally with respect to the neutronic reactor 15 by virtue of the fact that the structure 21 is mounted on rails 23.

Referring now to Figures 2–6 inclusive the invention as shown is in the form of the car 20 comprising a flat car floor member 24 mounted on wheeled axles 25 and supporting the charging device generally indicated at 26.

Figure 6:
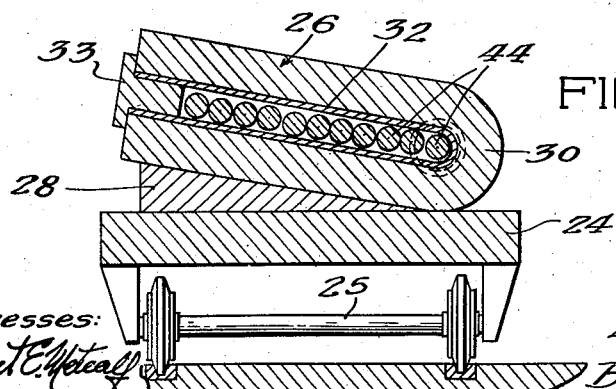
Figure 6 is a vertical sectional view shown partially in elevation and taken on the line 6—6 of Figure 2.

This charging device 26 includes a hopper or magazine 27 substantially U-shaped in cross section and supported in a somewhat inclined position on a wedge member 28 (see Fig. 6). This hopper 27 has relatively thick side, bottom, front and rear walls 29, 30, 31 and 31a respectively. The walls 31 and 31a have aligned apertures 31b and 31c respectively, adjacent the lower closed side of the hopper 27. These thick walls are provided to prevent the passage of radioactive radiations such as gamma rays therethrough, and consequently are preferably made of lead or like material. A steel inner lining 32 is provided on the inside face of the hopper 27 as best shown in Figure 6. A removable lead plug or cap 33 closes the open side of the hopper 27, and likewise is adapted to absorb radioactive radiations passing from inside the hopper 27 toward the outside.

Extending behind the hopper 27 is a hydraulic cylinder 35 that is provided with openings 36 and 37 at opposite ends thereof for introducing and exhausting a hydraulic fluid into and from the cylinder 35. A plunger 38 is contained inside the cylinder 35, and as shown for example in Figure 4, projects through the aperture 31c into the lowermost part of the interior of the hopper 27. A packing gland 40 is mounted in the aperture 31c so as to embrace the plunger 38 where it enters the hopper 27. A piston 41 is mounted adjacent to the end of plunger 38 and is adapted to ride inside cylinder 35 in response to hydraulic pressure applied on each side thereof so as to move the plunger 38. On the front face of the hopper 27 is mounted a relatively thick shield 42 of lead or like material adapted to absorb radioactive radiations. An opening 43 is disposed through shield 42 in alignment with the aperture 31b and plunger 38 so that this plunger may pass through opening 43 and extend beyond the front face of shield 42.

As shown in Figure 6 the hopper 27 is adapted to receive a plurality of uranium bodies or rods 44. As previously mentioned these bodies may contain fissionable isotopes other than uranium, but for purposes of illustration these bodies will be referred to herein as uranium rods. As shown eleven rods are contained in the hopper 27 at one time though obviously more or less rods may be accommodated at one time.

In the form of the invention shown in Figures 2 to 6, for example, the front face of the shield 42 is flat and thus may be accommodated against the charging face of the reactor shown in Figure 1. This face of the reactor actually as shown is a lead plate shield 45 of a substantial thickness that is provided with a plurality of lead plugs 46 covering openings opposite tubes 17. If the tubes 17 project through the lead shield and project beyond the loading face 45 of the reactor then the tube would enter a recess 47 in the shield 42 and would be seated against a suitable gasket.

In the form of the device shown in Figures 7 to 9 the shield here referred to as 42a has an aperture 42ax and an outwardly projecting portion 42b that is adapted to project through the lead shield referred to at 45a. The shield aperture 42ax is aligned with the aperture 31b in hopper wall 31. In this instance the tube 17 in the reactor terminates short of the lead shield 45a. A gasket 48a is provided at the open end of the shield projection 42b against which tube 17 may be disposed.

When operating the loading device 20 the removable lid 33 is first removed and the uranium rods 44 inserted into the hopper 26 so that they are arranged as shown for example in Figure 6. For purposes of illustration it may be assumed that the number of rods that hopper 27 can accommodate will be sufficient for one tube 17 in the neutronic reactor 15. The lid 33 is then inserted in place to close the hopper 27. Car 20 is now moved on to the elevator structure 21 and is aligned with the particular tube 17 that is to be either initially loaded with uranium rods or reloaded with fresh rods as the case may be. The elevator structure 21 is manipulated so that the plunger 38 is brought to position in alignment with the selected tube 17 at which time the cap or plug 47 covering the end of the tube is withdrawn and the car is moved against the loading face 45 of the reactor so that the selected tube 17 is properly seated against the gasket 48 or 48a (see Figures 4 and 8). During all of this operation the plunger 38 is drawn completely inside the cylinder 35 so that the lower uranium rod 44 is in direct alignment with the end of plunger 38. The loading operation can now commence and to accomplish this hydraulic pressure is applied against piston 41 by introducing hydraulic fluid into port 37 in cylinder 35. This causes plunger 38 to move toward the reactor 15 thereby pushing the lowermost uranium rod 44 into the tube 17. In this operation it is necessary for the plunger 38 to enter tube 17 sufficiently to allow the uranium rod to seat itself in proper position in tube 17. Plunger 38 is then withdrawn and returned to cylinder 35 by means of discontinuing the introduction of hydraulic fluid through port 37 and commencing the introduction of such fluid through port 36 and allowing the previously introduced fluid to exhaust through port 37. In this manner plunger 38 is returned to its initial position where it is completely withdrawn from hopper 27 thus allowing the uranium rods 44 remaining in the hopper to roll by gravity so that the lowermost one is disposed at the bottom of the hopper in direct alignment with plunger 38. The plunger 38 is then again moved toward the reactor so as to introduce the second uranium rod 44 into the selected tube 17 and in this instance the first uranium rod 44 is moved further into the reactor by means of the second rod. These operations of plunger 38 are repeated until all of the uranium rods 44 have been introduced into the selected tube 17 or at least until the desired number have been thus charged into the tube.

The operation of the plunger 38 may be manipulated by means of valves (not shown) that control the flow of hydraulic fluid through ports 36 and 37. This can be done manually or automatically in a manner that will be apparent to anyone skilled in the art.

For purposes of illustration, specific embodiments have been selected, but it is recognized that modifications may be made without departing from the scope of the invention.

What is claimed is:

A device for charging fissionable bodies into a neutronic reactor, comprising a car having wheels, a magazine of substantially U-shaped cross section having an open side, a closed side, and end walls, each wall being provided with an aperture adjacent to the closed side of the magazine, said magazine and walls being constructed of lead, means mounting the magazine on the car in an inclined position with the closed side of the magazine on a lower level than the open side, a removable lead cap disposed in the open side of the magazine, a steel inner lining disposed upon the inner surface of the magazine, a plunger slidably mounted on the car for movement with respect to the car and the magazine and aligned with the apertures in the walls of the magazine, means for reciprocating the plunger, and an apertured projecting portion secured to the magazine in alignment with one aperture therein so as to be adapted to be inserted in an opening in the reactor by rolling of the car on its wheels toward the reactor.

References Cited in the file of this patent

UNITED STATES PATENTS

| | | |
|---|---|---|
| 405,598 | Raymond | June 18, 1889 |
| 593,968 | Patterson | Nov. 16, 1897 |
| 1,290,163 | Fuchs | Jan. 7, 1919 |
| 1,297,240 | Pritchett | Mar. 11, 1919 |
| 1,337,444 | Douglas | Apr. 20, 1920 |
| 1,521,324 | Revelli | Dec. 30, 1924 |
| 1,632,414 | Nosan | June 14, 1927 |
| 1,697,811 | Dailey | Jan. 1, 1929 |
| 1,891,531 | George | Dec. 20, 1920 |
| 2,192,677 | Hoagland et al. | Mar. 5, 1940 |
| 2,445,326 | Janney | July 20, 1948 |